Figure 1:
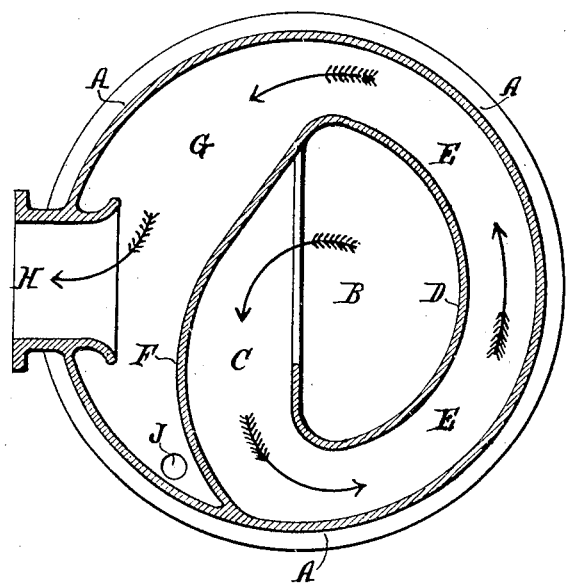

No. 869,680. PATENTED OCT. 29, 1907.
H. W. AITKEN & W. MACKIE.
APPARATUS FOR SEPARATING LIQUIDS FROM VAPORS.
APPLICATION FILED APR. 2, 1907.

3 SHEETS—SHEET 1.

WITNESSES

INVENTORS

ATTORNEYS

No. 869,680.   PATENTED OCT. 29, 1907.
H. W. AITKEN & W. MACKIE.
APPARATUS FOR SEPARATING LIQUIDS FROM VAPORS.
APPLICATION FILED APR. 2, 1907.

3 SHEETS—SHEET 2.

WITNESSES

INVENTORS

ATTORNEYS

No. 869,680. PATENTED OCT. 29, 1907.
H. W. AITKEN & W. MACKIE.
APPARATUS FOR SEPARATING LIQUIDS FROM VAPORS.
APPLICATION FILED APR. 2, 1907.

3 SHEETS—SHEET 3.

WITNESSES
Walter Abby
L. H. Grote

INVENTORS
Hugh Wallace Aitken
William Mackie
BY
Howson & Howson
ATTORNEYS

THE NORRIS PETERS CO., WASHINGTON, D. C.

UNITED STATES PATENT OFFICE.

HUGH WALLACE AITKEN AND WILLIAM MACKIE, OF GLASGOW, SCOTLAND.

APPARATUS FOR SEPARATING LIQUIDS FROM VAPORS.

No. 869,680.  Specification of Letters Patent.  Patented Oct. 29, 1907.

Application filed April 2, 1907. Serial No. 365,938.

*To all whom it may concern:*

Be it known that we, HUGH WALLACE AITKEN and WILLIAM MACKIE, subjects of the King of Great Britain and Ireland, and residents of Glasgow, Scotland, have invented certain new and useful Improvements in Apparatus for Separating Liquids from Vapors, and of which the following is the specification.

This invention relates to apparatus for separating liquids from vapors. Certain known forms of this kind of apparatus are such that centrifugal force is developed in the vapors passing through them, and thus the separation of the liquids they contain is assisted, but in some of these known forms of apparatus no means are provided to maintain the velocity of the vapors—thus the centrifugal force is not of sufficient intensity to be useful—and in others although the vapors after entry take in part of their course a volute or spiral direction, no means are provided to constrain them to do so or to prevent any centrifugal action which thus might be developed from being destroyed by eddying and by the development of currents in opposite directions around the chambers in which swirling is supposed to take place. In other known forms the objections referred to are overcome, but in these the inlet is tangential which is a construction in many cases extremely difficult and expensive to arrange.

This invention has for its object to provide improved, simple, and effective apparatus in which the vapors are constrained to take such a path that centrifugal force is effectively developed in them, in which provision is made for maintaining up to a certain point their velocity (and so their centrifugal force) and in which after that point is attained provision is made for reducing their velocity so that their final moisture may be deposited before their exit from the apparatus.

Apparatus made according to the invention therefore comprises essentially a centrifugal swirling chamber or chambers, into which the vapor is guided definitely in one direction by a substantially central and axial inlet and the area of which is gradually reduced as it advances from the inlet (so maintaining the vapor's velocity); and an expansion chamber or chambers, between the swirling chamber or chambers and the outlet and in which the velocity of the vapor is reduced (because of and in proportion to the expansion of the vapor) before it reaches the latter.

In order that the invention and the manner of performing the same may be properly understood there are hereunto appended three sheets of explanatory drawings throughout which like reference letters indicate like parts. In these drawings are shown five examples of the improved apparatus all characterized by the common features of centrifugal swirling chambers, having substantially central and axial inlets, the areas of the chambers being gradually restricted from the inlet and expansion chambers between the restricted part and the outlet.

Figure 2:
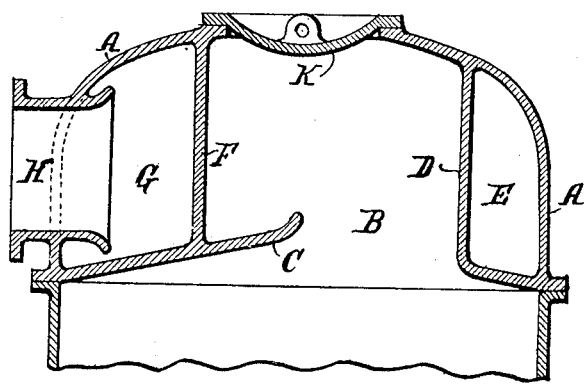
Figure 3:
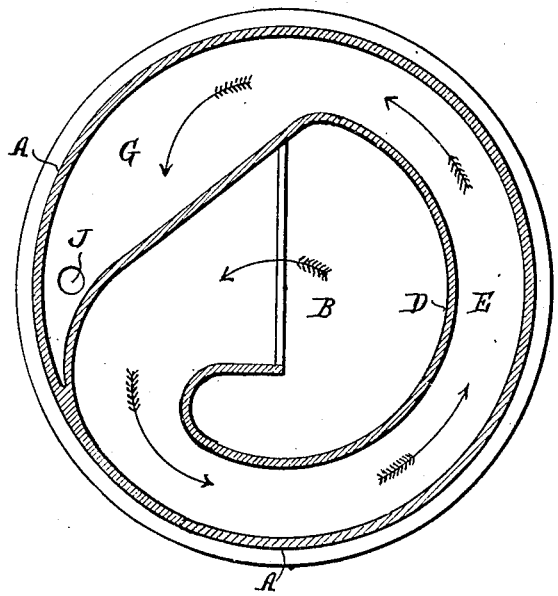
Figure 4:
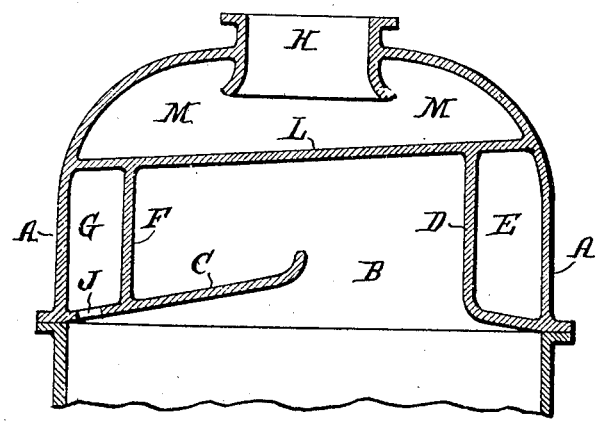
Figure 7:
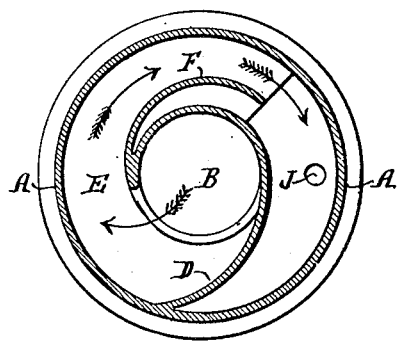
Figure 8:
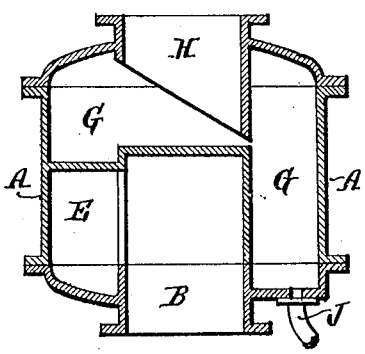
Figure 9:
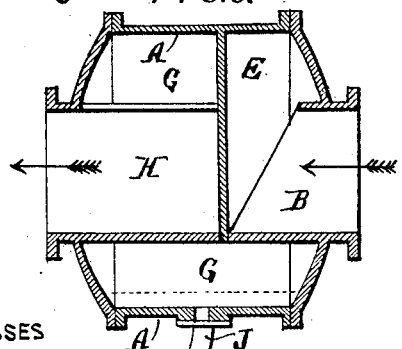
Figure 10:
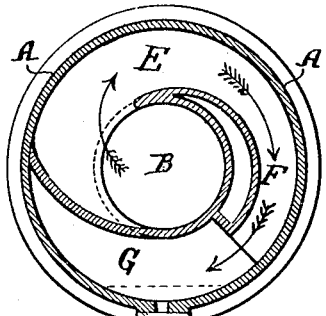

In Figures 1 and 2, Sheet 1, an example is shown in sectional plan and in transverse vertical section; in Figs. 3 4, Sheet 2, and Figs. 5 and 6, and 7 and 8, Sheet 3, like views of three other examples; and in Figs. 9 and 10, on that sheet longitudinal and transverse vertical sections of another example.

According to the example shown in Figs. 1 and 2, the apparatus comprises a cylindrical dome-topped casing, A, arranged with its axis vertical. The vapor gains access to this casing by an aperture, B, practically axial and formed in a bottom plate, C. As shown by the arrows in Fig. 1, the vapor is delivered in a more or less radial direction by a curved guide plate or partition, D, to a passage, E, around the internal circumference of the casing, A, formed on the outside by the casing itself and on the inside by a vertical partition plate, F, and closed on the bottom by the bottom plate, C, and on the top by the domed part of the casing, A. It will be seen that the passage thus formed is of gradually restricted area as it recedes from the inlet, B. The inner end of the passage, E, debouches into an expansion chamber, G, formed by the space between the inlet guiding partition, D, and the remainder of the wall of the casing, A. A radial discharge pipe, H, and a drain aperture, J, (by which latter the liquid is returned to the vessel to which the separator is applied) are arranged in this chamber, while a manhole closed by a door, K, gives access to the apparatus for cleaning purposes.

The example shown in Figs. 3 and 4, Sheet 2, only differs from that just described in that the discharge pipe, H, is arranged axially. To this end there is provided a roof like partition, L, closing the top of the inlet part of the apparatus and of the passage, E, but open to the expansion chamber, G, of which a continuation is formed by the space, M, between the partition, L, and the domed top of the casing, A.

Figure 5:
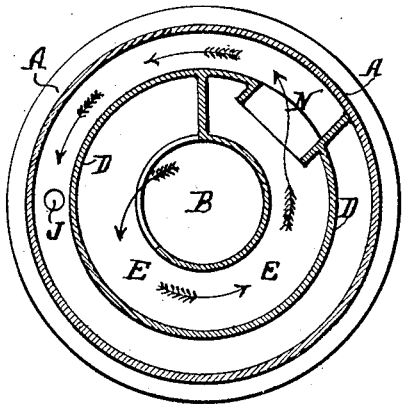
Figure 6:
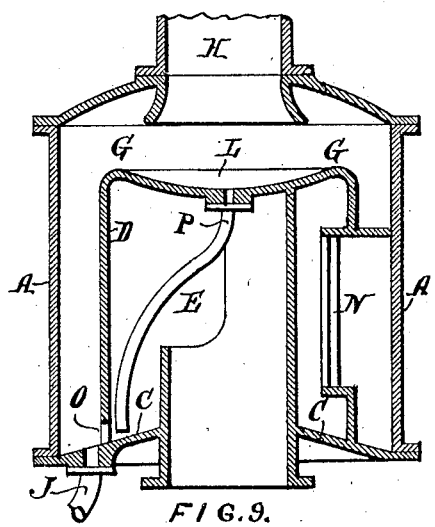

The same arrangement of swirling, constricted, and expansion chamber is attained in a manner differing structurally in the example shown in Figs. 5 and 6, Sheet 3. In this example the vapor enters by a central axial pipe, B (closed at its upper end) to a constricted passage, E, formed between the external surface of the pipe and a substantially circular partition plate, D. It flows as shown by the arrows in Fig. 5, through this passage and debouches through an aperture, N, in the partition, D, into an outer concentric passage formed between the outer surface of the partition, D, and the wall of the casing, A. The passage, E, is closed on the top by a cover plate, L, and on the bottom by a bottom plate, C. The vapor after entry to the outer concentric passage is free to expand upwards into an expansion chamber, G, formed in the whole upper part of the casing, A, and finally is discharged by a pipe, H. The plate, L, is dished upon its upper surface so as to collect deposited moisture which is discharged by a drain pipe, P, to the floor of the passage, E, from which it finds its way by an aperture, O, to the drain aperture, J.

In the example shown in Figs. 7 and 8, the vapor entering similarly by an axial pipe, B, flows as shown by the arrows in Fig. 7, around a roofed constricted passage, E, formed between the wall of the casing, A, and a partition plate, F, the passage being closed at its other end by a guide partition, D. On leaving the passage, E, the vapor is free to rise and expand in the expansion chamber, G, formed by the whole space between the top of the casing, A, at one side, and the bottom of the casing, and at the other side, the roof of the passage, E, and finds its way out by a discharge pipe, H, so shaped as to constrain the vapor to flow around the interior of the casing before entering it.

In Figs. 9 and 10 is shown an example only differing from that just described in that the casing, A, is arranged with its axis horizontal, inlet, B, and discharge, H, being also horizontal.

What we claim is:—

An apparatus for separating liquids from vapors comprising a casing, a substantially central and axial inlet thereto, a passage of contracted area formed between the wall of the chamber and a partition and into which the vapor is guided in a definite direction to cause swirling, an expansion chamber into which the vapor flows from the constricted passage, and a discharge outlet from the expansion chamber.

In testimony whereof we have signed our names to this specification, in the presence of two subscribing witnesses.

HUGH WALLACE AITKEN.
WILLIAM MACKIE.

Witnesses:
DAVID FERGUSON,
WILFRED HUNT.